United States Patent
Yi et al.

(10) Patent No.: US 10,054,363 B2
(45) Date of Patent: Aug. 21, 2018

(54) METHOD AND APPARATUS FOR CRYOGENIC DYNAMIC COOLING

(71) Applicant: WD Media, LLC, San Jose, CA (US)

(72) Inventors: Chang B. Yi, Fremont, CA (US);
Tatsuru Tanaka, Campbell, CA (US);
Phi Cam Ha, San Jose, CA (US); Noe D. Taburaza, Union City, CA (US);
Yew Ming Chiong, San Jose, CA (US);
Hongling Liu, Sunnyvale, CA (US)

(73) Assignee: WD Media, LLC, San Jose, CA (US)

( * ) Notice: Subject to any disclaimer, the term of this patent is extended or adjusted under 35 U.S.C. 154(b) by 606 days.

(21) Appl. No.: 14/461,153

(22) Filed: Aug. 15, 2014

(65) Prior Publication Data
US 2016/0047596 A1    Feb. 18, 2016

(51) Int. Cl.
F25D 25/00    (2006.01)
F25D 31/00    (2006.01)
G11B 5/84    (2006.01)

(52) U.S. Cl.
CPC .......... F25D 31/001 (2013.01); G11B 5/8404 (2013.01)

(58) Field of Classification Search
CPC . F25D 31/001; G11B 5/8404; G11B 33/1426; H01L 21/67109; H01L 21/67259
See application file for complete search history.

(56) References Cited

U.S. PATENT DOCUMENTS

| | | |
|---|---|---|
| 5,340,460 A | 8/1994 | Kobayashi et al. |
| 6,013,161 A | 1/2000 | Chen et al. |
| 6,053,704 A | 4/2000 | Yamamoto et al. |
| 6,056,857 A | 5/2000 | Hunt et al. |
| 6,063,248 A | 5/2000 | Bourez et al. |
| 6,068,891 A | 5/2000 | O'Dell et al. |
| 6,086,362 A * | 7/2000 | White ............... H01L 21/67098 118/724 |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |

(Continued)

Primary Examiner — Elizabeth Martin
(74) Attorney, Agent, or Firm — Loza & Loza, LLP; Gabriel Fitch

(57) ABSTRACT

A cryogenic dynamic cooling apparatus and a cooling method for heat assisted magnetic recording media substrate are provided. The cooling apparatus includes a chamber that is configured to receive a substrate. A substrate holder secures the substrate inside the chamber. The apparatus has a cooling plate that is movable between a retracted position and an extended position inside the chamber. The cooling plate provides clearance for movement of the substrate holder inside the chamber in the retracted position, and the cooling plate cools the substrate in the extended position. Also, the cooling plate is substantially parallel to and spaced apart from the substrate. The apparatus further includes a cryogenic operatively coupled to the cooling plate that is cooled by the cryogenic cooling element.

43 Claims, 6 Drawing Sheets

(56) References Cited

U.S. PATENT DOCUMENTS

| | | | |
|---|---|---|---|
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,209,220 B1* | 4/2001 | Raaijmakers | C23C 16/54 |
| | | | 34/391 |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,395,349 B1 | 5/2002 | Salamon | |
| 6,403,919 B1 | 6/2002 | Salamon | |
| 6,408,677 B1 | 6/2002 | Suzuki | |
| 6,426,157 B1 | 7/2002 | Hokkyo et al. | |
| 6,429,984 B1 | 8/2002 | Alex | |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,571,806 B2 | 6/2003 | Rosana et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,855,232 B2 | 2/2005 | Jairson et al. | |
| 6,857,937 B2 | 2/2005 | Bajorek | |
| 6,893,748 B2 | 5/2005 | Bertero et al. | |
| 6,899,959 B2 | 5/2005 | Bertero et al. | |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,967,798 B2 | 11/2005 | Homola et al. | |
| 6,972,135 B2 | 12/2005 | Homola | |
| 7,000,418 B2 | 2/2006 | Rogers et al. | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,090,934 B2 | 8/2006 | Hokkyo et al. | |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,229,266 B2 | 6/2007 | Harper | |
| 7,239,970 B2 | 7/2007 | Treves et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,292,329 B2 | 11/2007 | Treves et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,471,484 B2 | 12/2008 | Wachenschwanz et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,569,490 B2 | 8/2009 | Staud | |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,656,615 B2 | 2/2010 | Wachenschwanz et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,722,968 B2 | 5/2010 | Ishiyama | |
| 7,733,605 B2 | 6/2010 | Suzuki et al. | |
| 7,736,768 B2 | 6/2010 | Ishiyama | |
| 7,755,861 B1 | 7/2010 | Li et al. | |
| 7,758,732 B1 | 7/2010 | Calcaterra et al. | |
| 7,833,639 B2 | 11/2010 | Sonobe et al. | |
| 7,833,641 B2 | 11/2010 | Tomiyasu et al. | |
| 7,910,159 B2 | 3/2011 | Jung | |
| 7,911,736 B2 | 3/2011 | Bajorek | |
| 7,924,519 B2 | 4/2011 | Lambert | |
| 7,944,165 B1 | 5/2011 | O'Dell | |
| 7,944,643 B1 | 5/2011 | Jiang et al. | |
| 7,955,723 B2 | 6/2011 | Umezawa et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 | 12/2011 | Sonobe et al. | |
| 8,092,931 B2 | 1/2012 | Ishiyama et al. | |
| 8,100,685 B1 | 1/2012 | Harper et al. | |
| 8,101,054 B2 | 1/2012 | Chen et al. | |
| 8,125,723 B1 | 2/2012 | Nichols et al. | |
| 8,125,724 B1 | 2/2012 | Nichols et al. | |
| 8,137,517 B1 | 3/2012 | Bourez | |
| 8,142,916 B2 | 3/2012 | Umezawa et al. | |
| 8,163,093 B1 | 4/2012 | Chen et al. | |
| 8,171,949 B1 | 5/2012 | Lund et al. | |
| 8,173,282 B1 | 5/2012 | Sun et al. | |
| 8,178,480 B2 | 5/2012 | Hamakubo et al. | |
| 8,206,789 B2 | 6/2012 | Suzuki | |
| 8,218,260 B2 | 7/2012 | Iamratanakul et al. | |
| 8,247,095 B2 | 8/2012 | Champion et al. | |

(56) References Cited

U.S. PATENT DOCUMENTS

| | | |
|---|---|---|
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2004/0250996 A1* | 12/2004 | Yi .................... H01L 21/67109 165/86 |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0124903 A1* | 5/2008 | England ............. H01J 37/3171 438/530 |
| 2009/0117408 A1 | 5/2009 | Umezawa et al. |
| 2009/0136784 A1 | 5/2009 | Suzuki et al. |
| 2009/0165470 A1 | 7/2009 | Aoki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |

(56) References Cited

U.S. PATENT DOCUMENTS

| | | |
|---|---|---|
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

\* cited by examiner

METHOD AND APPARATUS FOR CRYOGENIC DYNAMIC COOLING

FIELD

Aspects of the present invention relate to a cooling apparatus, and more specifically to a cooling apparatus and a cooling method for cooling substrates during the manufacturing of magnetic recording media.

BACKGROUND

Heat-assisted magnetic recording (HAMR) is a technology that magnetically records data on recording media using thermal assistance. HAMR can utilize high-stability magnetic compounds that can store single bits in a small area. In general, a HAMR media stack includes a number of layers such as a bottom layer substrate, an adhesion layer on the substrate, an intermediate layer on the adhesion layer, a magnetic recording layer on the intermediate layer, a carbon overcoat layer, and a lubricant layer on the carbon overcoat layer.

In HAMR media manufacturing, a substrate is heated to a suitable temperature before depositing one or more magnetic recording layers. Then the substrate is cooled down before one or more carbon overcoat layers (e.g., a sputtered carbon layer or a diamond-like carbon (DLC) layer) are deposited on the substrate. The temperature for depositing the carbon layers is substantially lower than the deposition temperature of the magnetic recording layers.

DETAILED DESCRIPTION

Figure 1A:
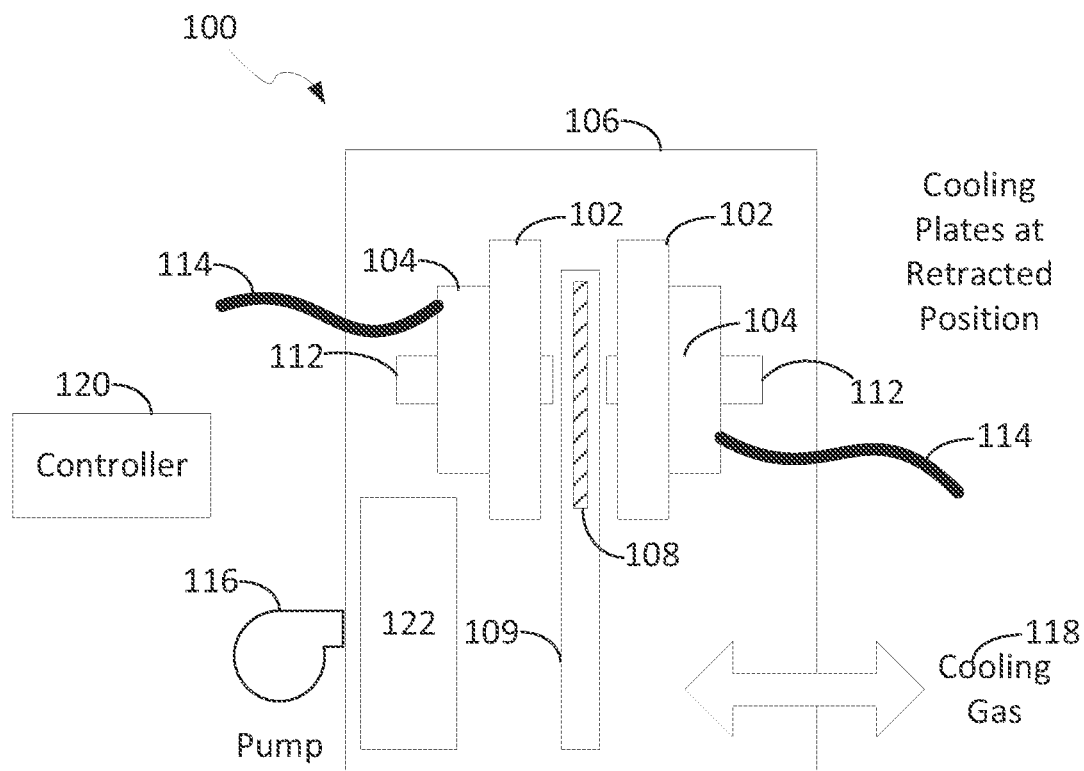
FIGS. 1a and 1b are schematic drawings conceptually illustrating a cryogenic dynamic cooling apparatus in accordance with an embodiment of the invention.

In the following description, specific examples are set forth to provide a thorough understanding of the present invention. It will be apparent, however, to one skilled in the art that the specific details illustrated in the examples are illustrative in nature, and the present invention is not restricted to the illustrated examples. Well known components or methods have not been described in detail to avoid unnecessarily obscuring various embodiments of the present invention.

Embodiments of the present invention provide a cryogenic dynamic cooling system capable of lowering the temperature of a substrate (e.g., a HAMR media substrate) at a cooling rate faster than that of conventional cooling systems such that the number of cooling chambers required may be reduced. Consequently, the number of sputter chambers available on a multi-chamber sputter machine may be increased without expensive capital investment.

Disk cooling stations have been used in hard disk media manufacturing for many years. For longitudinal magnetic recording (LMR), a media substrate is typically heated to about 300° C. prior to depositing magnetic layers on the substrate to achieve the desired recording performance. For perpendicular magnetic recording (PMR), media manufacturing utilizes lower heat, for example, below 200° C. before depositing the magnetic layers. However, for the deposition of a carbon overcoat, the substrate temperature is typically kept below 100° C. to 200° C. for corrosion protection and tribology performance consideration. Therefore, before depositing the carbon overcoat, the substrate is cooled down to a suitable deposition temperature.

One example of a disk or substrate cooling station uses static cooling plates (e.g., double-sided cooling plates). The cooling plate temperature is controlled by using either cooling water or a cryogenic refrigerant. The vacuum chamber of the cooling station is filled with a process gas such as helium, hydrogen, or a mixture of helium/hydrogen to increase heat transfer (e.g., thermal conduction) from the hot substrate to the cooling plate. Typically, the gas is evacuated from the chamber before transferring the substrate to the next chamber. Because the cooling plates are static, this design uses a relatively large clearance or gap (e.g., greater than 5 millimeters) between the cooling plate and the substrate to allow the substrate and its substrate holder to move safely without touching the cooling plate.

The substrate cooling rate is determined by a number of factors including (1) process gas pressure, (2) temperature difference (Delta-T) between the cooling plate and substrate, and (3) clearance or gap between the substrate and the cooling plate. A typical cooling rate observed with such static cooling station with hydrogen as the process gas is about 5 to 15° C./second.

Another example of a disk cooling station has movable cooling plates (i.e., dynamic cooling). Each of the cooling plates can be retracted from an extended position to provide enough clearance for movement when transferring the substrate in and out of the chamber of the cooling station. When a hot substrate arrives in the chamber, the cooling plate is moved to the extended position leaving a gap of, for example, 1 millimeter (mm) to 2 mm between the substrate and the cooling plate. This dynamic cooling design has a higher cooling rate than the static cooling design. In conventional dynamic cooling design, the temperature of the cooling plate is controlled by cooling water, not cryogenic refrigeration. These conventional cryogenic dynamic cooling systems often use rigid manifolds and thick insulation or vacuum containment bellows to prevent ice formation around the manifolds or connection points. As such, it is difficult to apply cryogenic cooling to movable cooling plates (dynamic cooling) due to the mechanical difficulties associated with the rigid manifolds and insulation. This type of cooling system can become inefficient when the Delta-T becomes smaller.

The above-described cryogenic static cooling station and water-cooled dynamic cooling station are insufficient for high volume HAMR media production. In HAMR media manufacturing, the substrate is heated to between about 400° C. and about 600° C. before depositing the magnetic layers on the substrate, while the deposition temperature for the carbon overcoat layer is generally less than 180° C. Therefore, if the cryogenic static cooling station or water-cooled dynamic cooling station is used, several cooling stations will be needed to cool down the HAMR media substrate to the desirable temperature at typical production throughput.

Figure 1B:
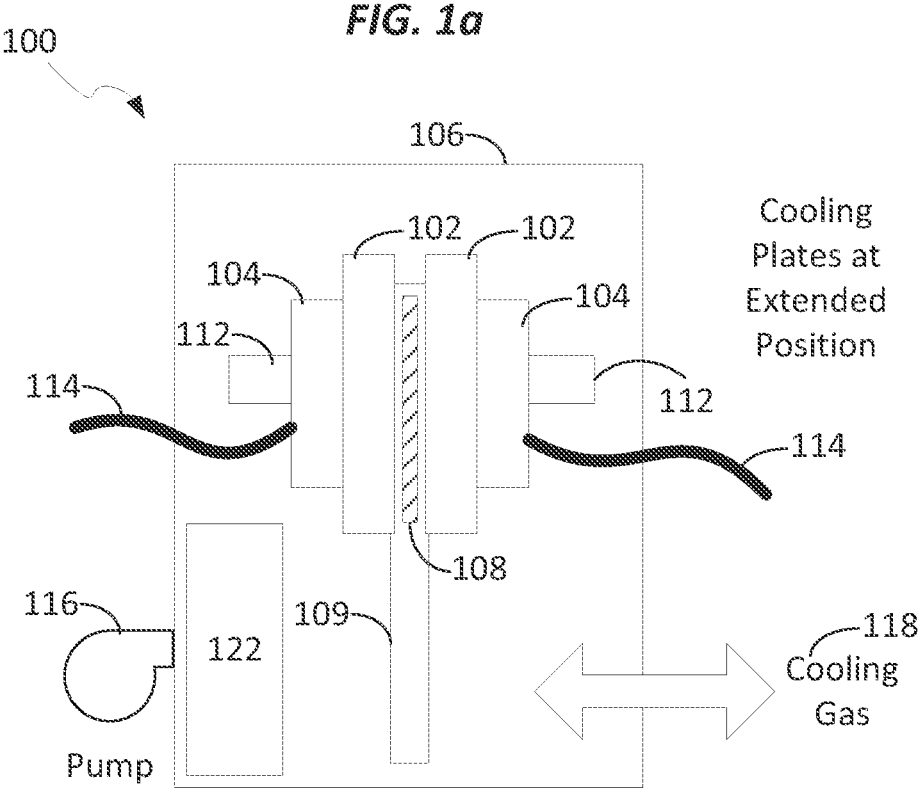

FIGS. 1a and 1b are schematic drawings conceptually illustrating a cryogenic dynamic cooling apparatus 100 in accordance with an embodiment of the invention. The cooling apparatus 100 combines the benefits of dynamic cooling (i.e., movable cooling plates) and cryogenic cooling to significantly increase cooling efficiency. The apparatus 100 provides is a non-contact, double-sided cooling method and is capable of supporting high throughput HAMR media production. In one example, the apparatus 100 can support a HAMR media production throughput between 1000 to 1400 parts per hour (PPH).

Referring to FIGS. 1a and 1b, the cooling apparatus 100 includes movable cooling plates 102 each attached to a cryogenic cold head 104 (a cryogenic cooling element) inside a vacuum chamber 106. In one example, the apparatus 100 can cool one or more substrates 108 at the same time. The substrate 108 may be held by a substrate holder 109 that can move the substrate 108 in and out of the vacuum chamber 106, and secure the substrate 108 between a pair cooling plates 102. In FIGS. 1a and 1b, only one substrate 108 is shown for reasons of clarity and not limitation. A pair of cooling plates 102 are positioned on opposite sides of a substrate 108 for double-sided cooling. Each cooling plate 102 is operatively coupled to a cryogenic cold head 104 that is cryogenically cooled. The cryogenic cold head 104 may be attached to the cooling plate 102 by any suitable methods such that the cooling plate 102 can be cooled by the cryogenic cold head 104 to a desired temperature. The cooling plate 102 and attached cryogenic cold head 104 are mounted on a linear slider 112 or guide that allows for linear motion of the cooling plate 102 and cryogenic cold head 104 in a direction substantially perpendicular to a surface of the substrate 108 between a retracted position (see FIG. 1a) and an extended position (see FIG. 1b). In one example, the apparatus 100 may include a servo motor system (not shown in FIGS. 1a and 1b) for moving the cooling plate 102 and cryogenic cold head 104 along the linear slider 112. At the retracted position, the cooling plates 102 is spaced further apart from the substrate 108 than that of the extended position.

In one example, the cooling plates 102 are maintained at a temperature between about −200° C. and about −80° C. by the cryogenic cold head 104. In a particular example, the cooling plate 102 may be maintained at a temperature between about −120° C. and about −100° C. In some examples, the cryogenic cold head 104 may be cooled by a cryogenic refrigerant such as helium or any suitable cryogenic refrigerants. For HAMR media manufacturing, for example, the cryogenic cold head 104 and/or cooling plate 102 will have sufficient cooling capacity to continuously operate at a desirable throughput for processing substrates with about 600° C. incoming temperature. In one example, the throughput may be about 5 to 6 seconds including cooling time and substrate transfer time.

In addition, the apparatus 100 uses flexible supply lines 114 to supply the cold heads 104 with a cryogenic refrigerant in order to accommodate movement of the cooling plate 102 and cryogenic cold head 104. In a non-limiting example, the flexible supply lines 114 can accommodate a linear movement of the cooling plate 102 and/or cold heat 104 for about 10 mm between the extended and retracted positions. In one example, for a certain cooling efficiency, the cooling plates 102 may be spaced less than 2 mm (e.g., 1 mm) apart from the substrate surface at the extended position. For transferring the substrate 108 and substrate holder 109 in and out of the vacuum chamber 106, the cooling plates 102 are set at the retracted position. For example, at the retracted position, the cooling plates 102 may be spaced at least 10 mm away from the substrate 108 to prevent contact. The cooling plates 102 are closer to the substrate 108 at the extended position than in the retracted position. In example, the cooling plates 102 may be at least 60 percent closer to the substrate 108 in the extended position than in the retracted position.

During cooling, the vacuum chamber 106 is maintained or pumped down to a vacuum or near vacuum condition, for example, by a pump 116 or a suitable apparatus. The vacuum chamber 106 may be isolated (i.e., airtight) by closing a gate valve, and then a suitable process gas (cooling gas) 118 is injected into the chamber and pressurized to about 1 Torr to 20 Torr. In some examples, the process gas 118 may be high purity hydrogen or helium gas, which is used as a cooling medium for improving cooling efficiency. In some examples, the pump 116 may also be used to inject and/or evacuate the process gas 118 in/out of the vacuum chamber 106. The cooling plates 102 are maintained at or cooled down to an operating temperature (e.g., about −200° C. to −80° C.) before starting production. In general, the substrate 108 will go through several heating and deposition processes before arriving at the chamber 106. Once the substrate 108 is inside the vacuum chamber 106 ready for cooling, a controller 120 (e.g., a control computer) will command the cooling plates 102 to move to the extended position, reducing the gap between the substrate surface and the cooling surfaces of the cooling plates 102 without making contact. In general, the smaller the gap is without touching, the better the cooling performance can be achieved. For example, at the extended position, the cooling plate 102 may be spaced apart from the substrate surface at about 0.5 mm to about 2 mm.

In some embodiments, the cooling apparatus 100 is capable of moving the cooling plates 102 between the extended and retracted positions within 0.1 seconds in order to increase the cooling time of the substrate 108. When the above-described cooling process is completed, the process gas 118 will be pumped out and the cooling plates 102 will be moved back to the retracted position such that the substrate 108 may be transferred out of the vacuum chamber 106 for further processing or deposition. In some embodiments, the apparatus 100 may use one or more volume reduction blocks 122 to reduce the volume inside the vacuum chamber 106 in order to reduce the time used to inject and evacuate the process gas 118.

Figure 2:
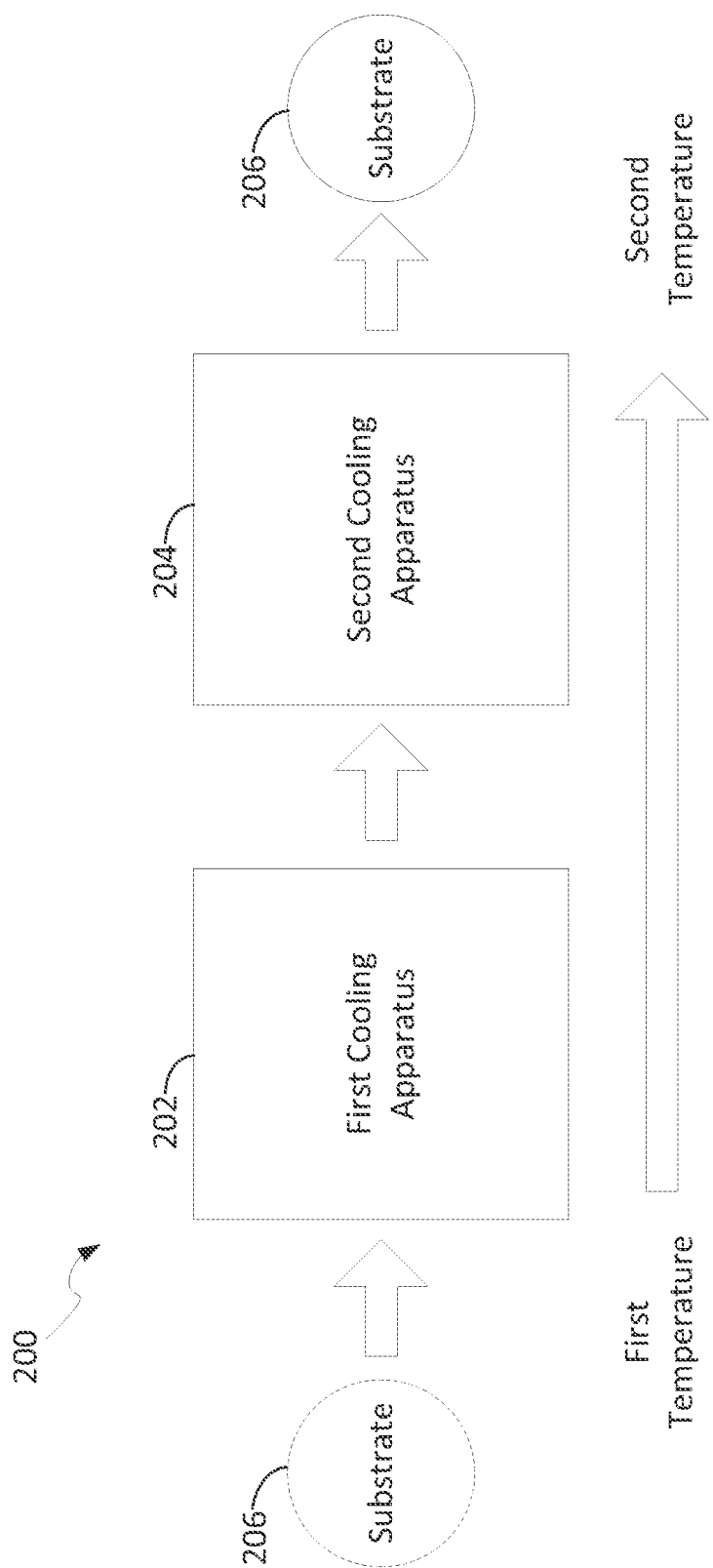
FIG. 2 is a schematic drawing conceptually illustrating a cooling system including multiple cryogenic dynamic cooling apparatuses in accordance with an embodiment of the invention.

FIG. 2 is a schematic drawing conceptually illustrating a cooling system 200 including multiple cryogenic dynamic cooling apparatuses in accordance with an embodiment of the invention. The cooling system 200 includes two or more cryogenic dynamic cooling apparatuses (e.g., a first cooling apparatus 202 and a second cooling apparatus 204). In one embodiment, the cryogenic dynamic cooling apparatuses 202 and 204 may be substantially the same as the cooling apparatus 100 of FIGS. 1a and 1b. In one example, the second cooling apparatus 204 may be identical to the first cooling apparatus 202.

In one embodiment, the cooling system 200 is configured to cool a substrate 206 (e.g., a HAMR media substrate) from a first temperature to a second temperature in about 10 seconds or less. For example, the first temperature may be a temperature (e.g., about 600° C.) that can facilitate deposition of a recording layer for heat assisted magnetic recording on the substrate 206, and the second temperature may be a temperature (e.g., about 150° C. or below) that can facilitate deposition of a carbon overcoat (e.g., a DLC layer) on the substrate 206. In this example, the substrate 206 is at about the first temperature before entering the first cooling apparatus 202, and the substrate 206 is at about the second temperature after exiting the second cooling apparatus 202. The total time (total cooling time) that the substrate 206 spent inside the first and second cooling apparatuses 202 and 204 and the transfer time between the apparatuses, is about 10 seconds or less in accordance with one embodiment. In other embodiments, the total cooling time may be more or less for different desired cooling needs.

In one embodiment, the first cooling apparatus 202 and second cooling apparatus 204 may have substantially the same configuration (e.g., their cooling plates are maintained at substantially the same temperature). In this case, the first cooling apparatus 202 may cause a greater drop in temperature of the substrate 206 than the second cooling apparatus 204 because the Delta-T of the substrate 206 will be greater in the first cooling apparatus 202.

Figure 3:
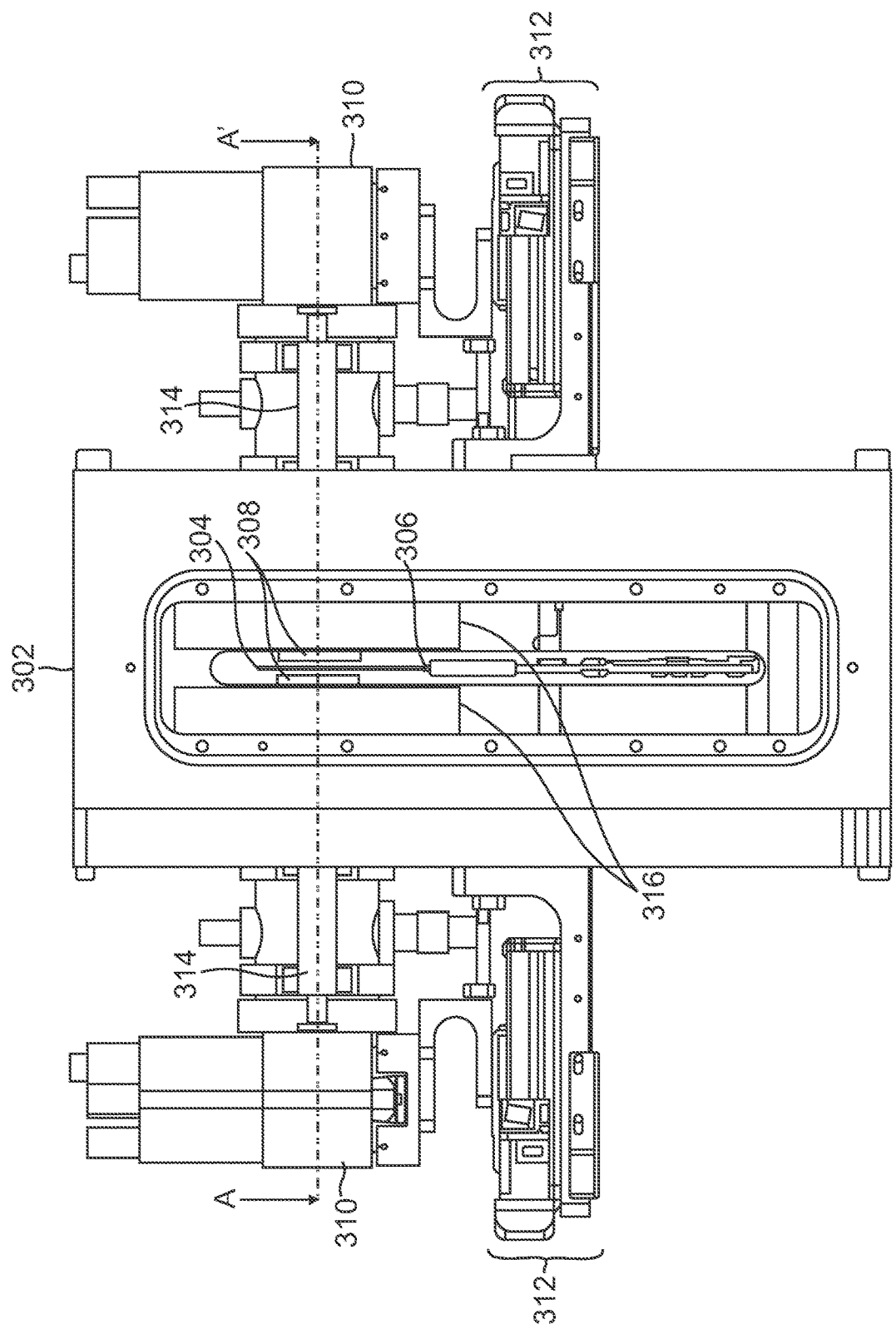
FIG. 3 is a drawing illustrating a side view of a cryogenic dynamic cooling apparatus in accordance with an embodiment of the present invention.
Figure 4:
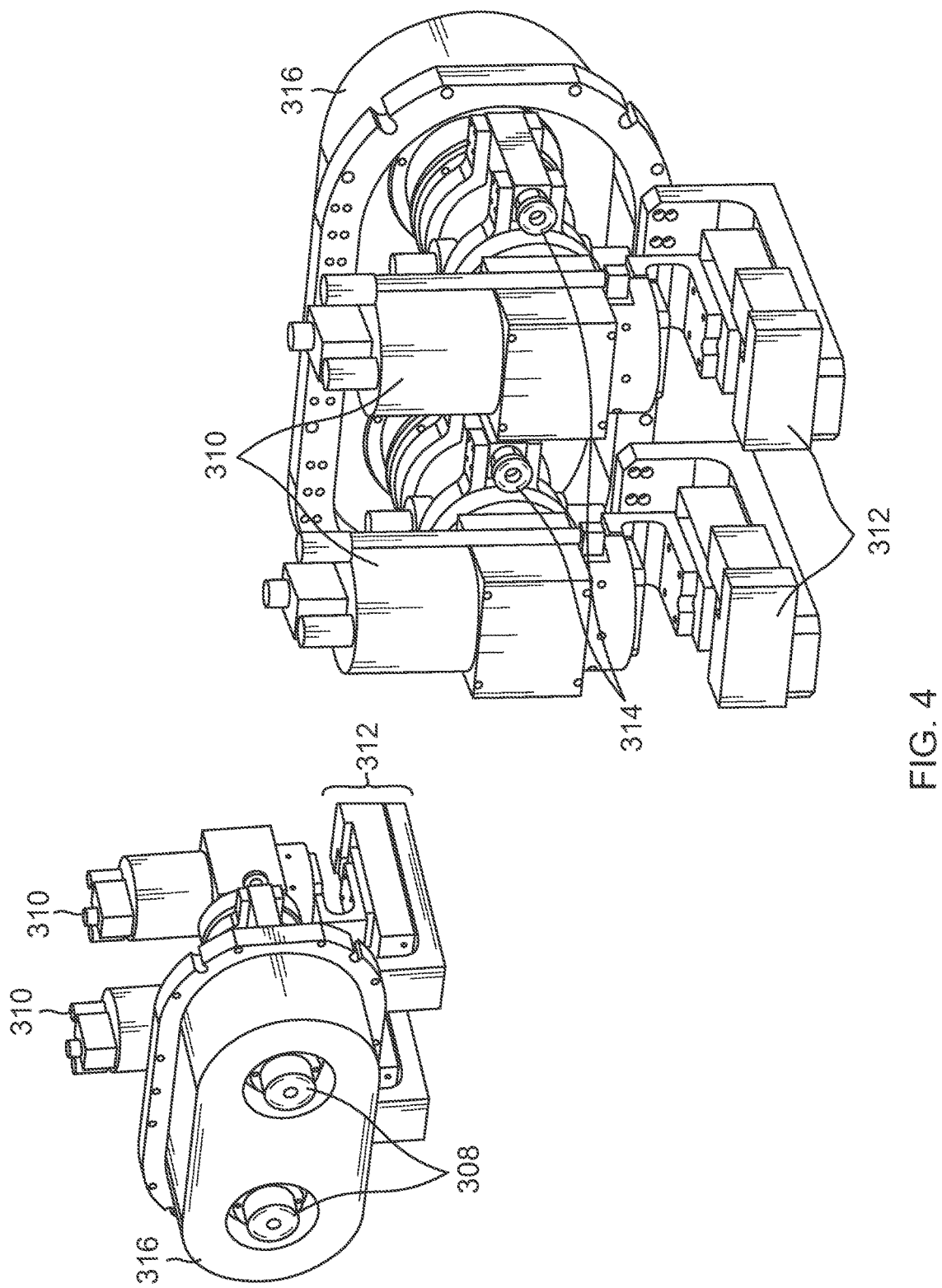
FIG. 4 is a drawing illustrating two perspective views of two exemplary cooling plates and attached cryogenic cooling elements of FIG. 3.
Figure 5:
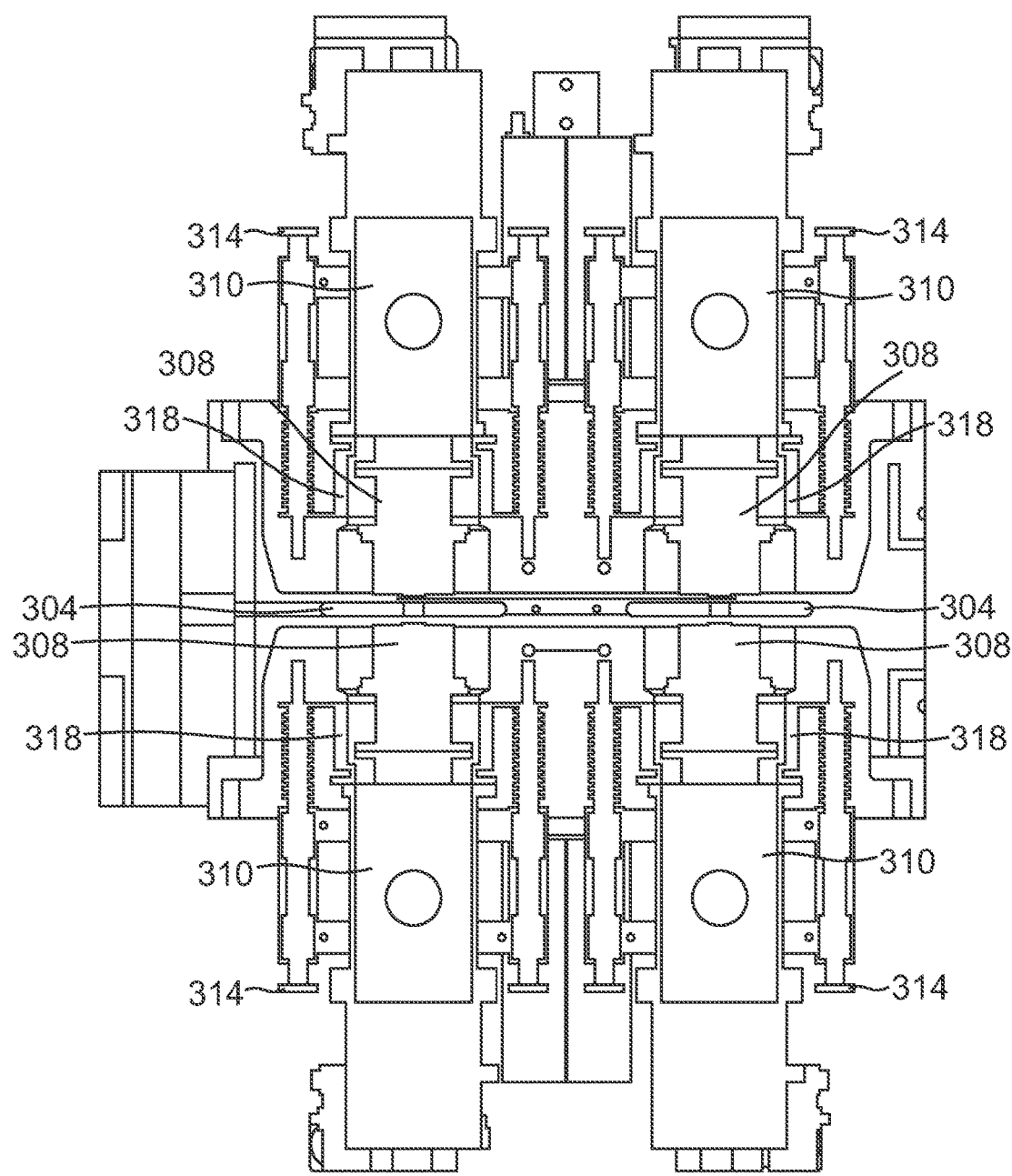
FIG. 5 is a drawing illustrating a cross sectional view of the cryogenic dynamic cooling apparatus of FIG. 3.

FIG. 3 is a drawing illustrating a side view of a cryogenic dynamic cooling apparatus 300 in accordance with an embodiment of the present invention. FIG. 4 is a drawing illustrating two perspective views of two exemplary cooling plates and attached cryogenic cooling elements of FIG. 3. FIG. 5 is a drawing illustrating a cross sectional view of the cooling apparatus 300 along the line A-A' shown in FIG. 3.

In some examples, the cooling apparatus 100 of FIGS. 1a and 1b may be implemented as the cryogenic dynamic cooling apparatus 300. The apparatus 300 has a vacuum chamber 302. Two substrates 304 (only one visible in FIG. 3) may be cooled inside the vacuum chamber 302 at the same time. The substrate 304 is secured by a substrate holder 306 that can move the substrate 304 in and out of the vacuum chamber 302. In FIG. 3, the substrate 304 may be moved in a direction into or out of the drawing. Two movable cooling plates 308 (e.g., cold head heatsinks) are dynamically positioned on opposite sides of the substrate 304, and are substantially parallel to and spaced apart from the substrate 304. The cooling plates 308 are at an extracted position to provide clearance for movement of the substrate 304 and/or substrate holder 306. For example, the cooling plates 308 are at the extracted position when the substrate 304 is moved in or out of the vacuum chamber 302. During cooling, the cooling plates 308 are moved to the extended position.

In one embodiment, a cryogenic cooling element 310 (e.g., a cryogenic cold head) is operatively coupled to each cooling plate 308, which is cooled by the cryogenic cooling element 310. The cryogenic cooling element 310 is cooled by a cryogenic refrigerant such as helium or any suitable refrigerant that can achieve cryogenic cooling or cryogenic cooling temperatures. In one embodiment, the cryogenic cooling element 310 may supply the cryogenic refrigerant to the cooling plate 308. The cryogenic refrigerant is supplied to the cryogenic cooling element 310 by a flexible supply line such that the cooling plate 308 (and the cryogenic cooling element 310) may be dynamically moved between the extended position and retracted position (i.e., dynamic cooling).

The cooling plate 308 and cryogenic cooling element 310 assembly is supported by or mounted on a linear stage 312 that allows the cooling plate 308 to move in a linear direction that is substantially perpendicular to the surface of the substrate 304. In FIG. 3, the linear direction corresponds to the left-right direction of the drawing. A linear guide 314 (e.g., a linear bearing) may be used to restrict the movement of the cooling plate 308 in a desired linear direction. In some embodiments, the dynamic cooling apparatus 300 may have one or more volume reduction block 316 to reduce the inside volume of the vacuum chamber 302 such that it takes less time to fill the vacuum chamber 302 with a process gas (e.g., helium or hydrogen) and evacuate the process gas. Referring to FIG. 5, a bellows 318 encloses at least a portion of the cooling plate 308 that is coupled to the cryogenic cooling element 310.

Figure 6:
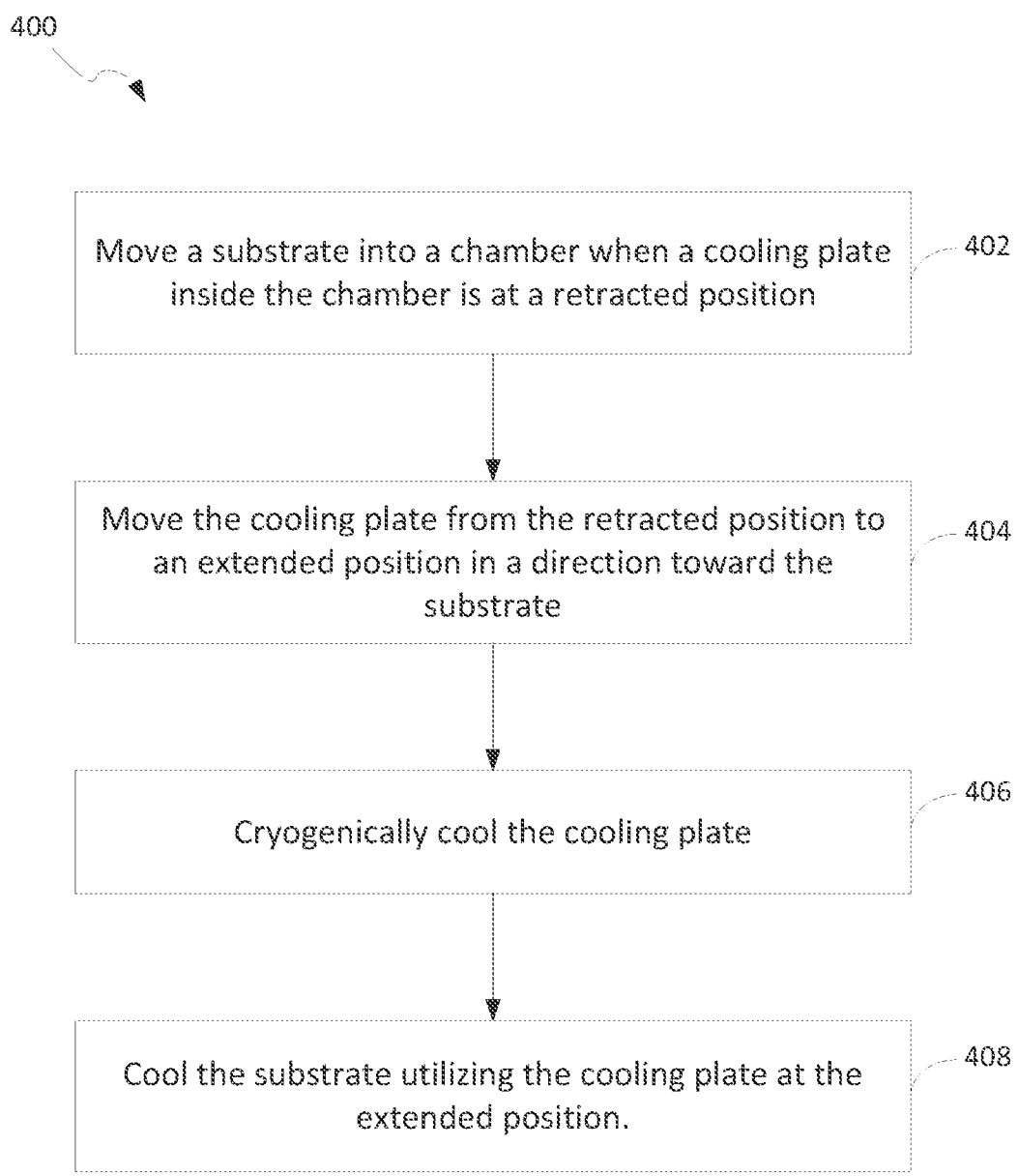
FIG. 6 is a flow chart illustrating a method of cooling a substrate using cryogenic dynamic cooling in accordance with an embodiment of the invention.

FIG. 6 is a flow chart illustrating a method 400 of cooling a substrate using cryogenic dynamic cooling in accordance with an embodiment of the invention. In a non-limiting example, the method 400 may be performed using the apparatus 300. At block 402, a substrate 108 (e.g., a HAMR substrate) is moved into a vacuum chamber 106 when a cooling plate 102 inside the chamber is at a retracted position. At block 404, the cooling plate 102 is moved from the retracted position to an extended position in a direction toward the substrate 108. In some examples, the method 400 may use a pair of cooling plates for double-sided cooling, and the pair of cooling plates are positioned on opposite sides of the substrate. At block 406, the cooling plate is cryogenically cooled. The method 400 may maintain the temperature of the cooling plate 102 between about −200° C. and about −80° C. In one particular example, the method 400 may maintain the temperature of the cooling plate 102 between about −120° C. and about −100° C.

At block 408, the substrate 108 is cooled utilizing the cooling plate 102 at the extended position. In some embodiments, the method 400 may be performed to cool two or more substrates at the same time using two or more pairs of movable cooling plates. Each pair of the cooling plates is positioned at opposite sides of the corresponding substrate.

In one example, the method 400 may move the cooling plate 102 at least about 5 mm in a linear direction between the retracted position and extended position. In one particular example, the method 400 may move the cooling plate 102 between about 5 mm and about 10 mm between the retracted position and extended position. In one embodiment, the method 400 may cool the substrate from a first desired temperature to a second desired temperature in about 10 seconds or less. The first temperature may be about 600° C., and the second temperature may be about 150° C. or below. At the retracted position, the cooling plate may be spaced apart from the substrate by at least 5 mm; and at the extended position, the cooling plate may be spaced apart from the substrate by less than 2 mm (e.g., 1 mm).

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

In several embodiments, the deposition of layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

It shall be appreciated by those skilled in the art in view of the present disclosure that although various exemplary fabrication methods are discussed herein with reference to magnetic recording disks or wafers containing magnetic heads, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A cooling apparatus comprising:
   a chamber;
   a substrate holder for securing a substrate inside the chamber;
   a cooling plate movable between a retracted position and an extended position inside the chamber, wherein the cooling plate provides clearance for movement of the substrate holder inside the chamber in the retracted position, wherein the cooling plate is for cooling the substrate in the extended position, and wherein the cooling plate is substantially parallel to and spaced apart from the substrate; and
   a cryogenic cold head operatively coupled to the cooling plate, wherein the cryogenic cold head is for supplying a cryogenic refrigerant to the cooling plate to cool the cooling plate.

2. The cooling apparatus of claim 1, wherein the cooling plate comprises at least one pair of cooling plates, and the pair of cooling plates are positioned at opposite sides of the substrate.

3. The cooling apparatus of claim 1, wherein the cooling plate is moveable in a linear direction substantially perpendicular to a surface of the substrate.

4. The cooling apparatus of claim 1, wherein the cryogenic cold head is for maintaining the cooling plate at a temperature between about −200 degrees Celsius and about −80 degrees Celsius.

5. The cooling apparatus of claim 4, wherein the cryogenic cold head is for maintaining the cooling plate at a temperature between about −120 degrees Celsius and about −100 degrees Celsius.

6. The cooling apparatus of claim 1, wherein the cooling plate is movable at least about 5 millimeters (mm) in a linear direction between the retracted position and the extended position.

7. The cooling apparatus of claim 6, wherein the cooling plate is movable between about 5 mm and about 10 mm between the retracted position and the extended position.

8. The cooling apparatus of claim 1, wherein:
   the cooling plate is for cooling the substrate from a first temperature to a second temperature in about 10 seconds or less; and
   the first temperature facilitates deposition of a recording layer for heat assisted magnetic recording on the substrate, and the second temperature facilitates deposition of a carbon overcoat on the substrate.

9. The cooling apparatus of claim 8, wherein the first temperature is about 600 degrees Celsius, and the second temperature is about 150 degrees Celsius or below.

10. The cooling apparatus of claim 1, further comprising a flexible supply line for supplying the cryogenic refrigerant to the cryogenic cold head.

11. The cooling apparatus of claim 1, wherein:
    at the retracted position, the cooling plate is spaced apart from the substrate by at least 5 millimeters; and
    at the extended position, the cooling plate is spaced apart from the substrate by less than 2 millimeters.

12. The cooling apparatus of claim 11, wherein at the extended position, the cooling plate is spaced apart from the substrate by about 1 millimeter.

13. The cooling apparatus of claim 1, wherein the substrate comprises a heat assisted magnetic recording (HAMR) media substrate.

14. The cooling apparatus of claim 1, further comprising:
    a volume reduction block inside the chamber, for reducing a volume inside the chamber.

15. The cooling apparatus of claim 1, further comprising a pump operatively coupled to the chamber to pump a gas into or out of the chamber, wherein the gas is selected from the group consisting of hydrogen and helium.

16. The cooling apparatus of claim 15, wherein the gas comprises a mixture of hydrogen and helium.

17. The cooling apparatus of claim 1, wherein the cooling plate is closer to the substrate in the extended position than in the retracted position.

18. The cooling apparatus of claim 17, wherein the cooling plate is at least 60 percent closer to the substrate in the extended position than in the retracted position.

19. The cooling apparatus of claim 1, further comprising a bellows enclosing at least a portion of the cooling plate coupled to the cryogenic cold head.

20. The cooling apparatus of claim 1, wherein:
    the substrate comprises at least two substrates; and
    the cooling plate comprises at least two pairs of cooling plates, wherein each pair of the cooling plates are configured to be moved toward opposite sides of a corresponding one of the substrates.

21. The cooling apparatus of claim 1, wherein the cryogenic refrigerant comprises helium.

22. A cooling system comprising:
    a first cooling apparatus comprising the cooling apparatus of claim 1; and
    a second cooling apparatus identical to the first cooling apparatus;
    wherein the first cooling apparatus and the second cooling apparatus are configured to cool a substrate in sequence.

23. The cooling system of claim 22, wherein the first cooling apparatus is configured to cause a greater drop in temperature of the substrate than the second cooling apparatus.

24. A method of cooling a substrate, comprising:
moving a substrate into a chamber when a cooling plate inside the chamber is at a retracted position;
moving the cooling plate from the retracted position to an extended position in a direction toward the substrate;
cryogenically cooling the cooling plate by supplying a cryogenic refrigerant to the cooling plate; and
cooling the substrate utilizing the cooling plate at the extended position.

25. The method of claim 24, wherein the moving the cooling plate comprises moving at least one pair of cooling plates toward opposite sides of the substrate.

26. The method of claim 24, wherein the moving the cooling plate comprises moving the cooling plate in a linear direction substantially perpendicular to a surface of the substrate.

27. The method of claim 24, wherein the cryogenically cooling the cooling plate comprises maintaining the cooling plate at a temperature between about −200 degrees Celsius and about −80 degrees Celsius.

28. The method of claim 27, wherein the cryogenically cooling the cooling plate comprises maintaining the cooling plate at a temperature between about −120 degrees Celsius and about −100 degrees Celsius.

29. The method of claim 24, wherein the moving the cooling plate comprises moving the cooling plate at least about 5 millimeters (mm) in a linear direction between the retracted position and the extended position.

30. The method of claim 29, wherein the moving the cooling plate comprises moving the cooling plate between about 5 mm and about 10 mm between the retracted position and the extended position.

31. The method of claim 24, wherein the cooling the substrate comprises cooling the substrate from a first temperature to a second temperature in about 10 seconds or less, and
wherein the first temperature facilitates deposition of a recording layer for heat assisted magnetic recording on the substrate, and the second temperature facilitates deposition of a carbon overcoat on the substrate.

32. The method of claim 31, wherein the first temperature is about 600 degrees Celsius, and the second temperature is about 150 degrees Celsius or below.

33. The method of claim 24, further comprising supplying the cryogenic refrigerant through a flexible supply line to a cryogenic cold head operatively coupled to the cooling plate.

34. The method of claim 24, wherein:
at the retracted position, the cooling plate is spaced apart from the substrate by at least 5 millimeters; and
at the extended position, the cooling plate is spaced apart from the substrate by less than 2 millimeters.

35. The method of claim 34, wherein at the extended position, the cooling plate is spaced apart from the substrate by about 1 millimeter.

36. The method of claim 24, wherein the substrate comprises a heat assisted magnetic recording (HAMR) media substrate.

37. The method of claim 24, further comprising reducing a volume of the chamber utilizing a volume reduction block inside the chamber.

38. The method of claim 24, further comprising pumping a gas into or out of the chamber, wherein the gas is selected from the group consisting of hydrogen and helium.

39. The method of claim 38, wherein the gas comprises a mixture of hydrogen and helium.

40. The method of claim 24, wherein the cooling plate is closer to the substrate in the extended position than in the retracted position.

41. The method of claim 40, wherein the cooling plate is at least 60 percent closer to the substrate in the extended position than in the retracted position.

42. The method of claim 24, wherein:
the substrate comprises at least two substrates; and
the moving the cooling plate comprises moving at least two pairs of cooling plates, wherein each pair of the cooling plates are moved toward opposite sides of a corresponding one of the substrates.

43. The method of claim 24, wherein the cryogenic refrigerant comprises helium.

* * * * *